United States Patent
Nakajima et al.

(10) Patent No.: US 11,306,677 B2
(45) Date of Patent: Apr. 19, 2022

(54) FUEL INJECTION CONTROL APPARATUS

(71) Applicant: Honda Motor Co., Ltd., Tokyo (JP)

(72) Inventors: Masatoshi Nakajima, Wako (JP); Masahiro Takeuchi, Wako (JP); Hidekazu Hironobu, Wako (JP); Daiki Yamazaki, Wako (JP); Nobuaki Ito, Wako (JP); Ryuichi Hata, Wako (JP); Yasunori Shinmi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/215,269

(22) Filed: Mar. 29, 2021

(65) Prior Publication Data
US 2021/0301756 A1  Sep. 30, 2021

(30) Foreign Application Priority Data

Mar. 31, 2020 (JP) .............................. JP2020-065398

(51) Int. Cl.
*F02D 41/40* (2006.01)
*F02D 41/00* (2006.01)

(52) U.S. Cl.
CPC ......... *F02D 41/402* (2013.01); *F02D 41/009* (2013.01); *F02D 2200/101* (2013.01)

(58) Field of Classification Search
CPC ........ F02D 41/00; F02D 41/009; F02D 41/40; F02D 41/402; F02D 2200/101
USPC ..... 123/295–299, 301, 305, 198 D, 198 DC, 123/198 F; 701/101–105, 114
See application file for complete search history.

(56) References Cited

U.S. PATENT DOCUMENTS 5,685,276 A  *  11/1997  Tanaka .................. F02D 41/345
                                                   123/478
9,840,980 B2 *  12/2017  Cohn ...................... F02P 5/152
                        (Continued)

FOREIGN PATENT DOCUMENTS

JP    2000328985 A    11/2000
JP    2011106350 A    6/2011
              (Continued)

OTHER PUBLICATIONS

Japanese office action; Application 2020-065398; dated Jan. 25, 2022.

*Primary Examiner* — John Kwon
*Assistant Examiner* — Johnny H Hoang
(74) *Attorney, Agent, or Firm* — Duft & Bornsen, PC

(57) ABSTRACT

A fuel injection control apparatus including a microprocessor. The microprocessor is configured to perform calculating injection target values per a combustion cycle, controlling a fuel injector so as to inject fuel in accordance with the injection target values, instructing a switching between a first mode injecting the fuel and a second mode stopping the fuel injection, determining whether it is possible to inject the fuel in accordance with the injection target values when the switching from the second mode to the first mode is instructed, and modifying the injection target values by reducing a target injection frequency when it is determined to be impossible to inject the fuel in accordance with the injection target values, and the controlling including controlling the fuel injector, when the injection target values are modified, so as to inject the fuel in accordance with modified injection target values.

6 Claims, 9 Drawing Sheets

(56) References Cited

U.S. PATENT DOCUMENTS

| | | | | |
|---|---|---|---|---|
| 2002/0038655 | A1* | 4/2002 | Suzuki | F02P 15/08 |
| | | | | 123/638 |
| 2003/0233997 | A1* | 12/2003 | Kawaguchi | F02D 41/0085 |
| | | | | 123/299 |
| 2005/0092297 | A1* | 5/2005 | Takemoto | F02D 41/401 |
| | | | | 123/406.47 |
| 2014/0216414 | A1* | 8/2014 | Kawabe | F02D 41/221 |
| | | | | 123/478 |
| 2016/0177855 | A1* | 6/2016 | Kusakabe | F02D 41/20 |
| | | | | 123/490 |
| 2017/0096959 | A1* | 4/2017 | Kaneko | F02D 41/3017 |
| 2018/0087466 | A1* | 3/2018 | Bromberg | F02D 41/1498 |
| 2018/0306106 | A1* | 10/2018 | Glugla | F02D 13/0203 |

FOREIGN PATENT DOCUMENTS

| | | | |
|---|---|---|---|
| JP | 2012241654 | A | 12/2012 |
| JP | 2019152144 | A | 9/2019 |

\* cited by examiner ably to the embodiment of the present invention is applied;

FUEL INJECTION CONTROL APPARATUS

CROSS-REFERENCE TO RELATED APPLICATION

This application is based upon and claims the benefit of priority from Japanese Patent Application No. 2020-065398 filed on Mar. 31, 2020, the content of which is incorporated herein by reference.

BACKGROUND OF THE INVENTION

Field of the Invention

This invention relates to a fuel injection control apparatus for controlling an operation of fuel injection in a direct-injection internal combustion engine.

Description of the Related Art

As this type of apparatuses, there have been a known apparatus that starts fuel injection in the intake stroke by not only calculating the fuel injection time during the intake stroke but also previously calculating the fuel injection time during the exhaust stroke, considering the load of injection-related calculation. Such an apparatus is described in, for example, Japanese Unexamined Patent Application Publication No. 2019-152144 (JP2019-152144A).

However, in the case of an apparatus having a function of stopping fuel injection when a predetermined fuel cut condition is satisfied during travel of a vehicle, even if a fuel cut recovery condition is satisfied in the intake stroke, the apparatus may have difficulty in restarting fuel injection in the intake stroke and thus recover from the fuel cut state at a delayed timing.

SUMMARY OF THE INVENTION

An aspect of the present invention is a fuel injection control apparatus for an internal combustion engine, the internal combustion engine including a piston reciprocating in a cylinder and a fuel injector arranged to inject a fuel into a combustion chamber facing the piston in the cylinder. The apparatus includes an electronic control unit having a microprocessor and a memory. The microprocessor is configured to perform: calculating injection target values including a target amount of injection, a target injection timing and a target injection frequency in an injectable crank angle area per a combustion cycle of the internal combustion engine, based on an operation state of the internal combustion engine; controlling the fuel injector so as to inject the fuel in accordance with the injection target values; instructing a switching from a first mode in which the fuel is injected into the combustion chamber to a second mode in which an injection of the fuel is stopped, and a switching from the second mode to the first mode; determining whether it is possible to inject the fuel in accordance with the injection target values when the switching from the second mode to the first mode is instructed; and modifying the injection target values by reducing the target injection frequency when it is determined that it is impossible to inject the fuel in accordance with the injection target values, under a state that the target injection frequency included in the injection target values is a plurality of times, and the microprocessor is configured to perform the controlling including controlling the fuel injector, when the injection target values are modified, so as to inject the fuel in accordance with modified injection target values.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 13. A fuel injection control apparatus according to the embodiment of the present invention is applied to vehicles including a direct-injection gasoline engine as an internal combustion engine. Specifically, this fuel injection control apparatus is applied to engine vehicles that travel using only an engine as a drive source and hybrid vehicles that travel using an engine and a motor as drive sources. Hereafter, an example will be described in which this fuel injection control apparatus is applied to a hybrid vehicle.

Figure 1:
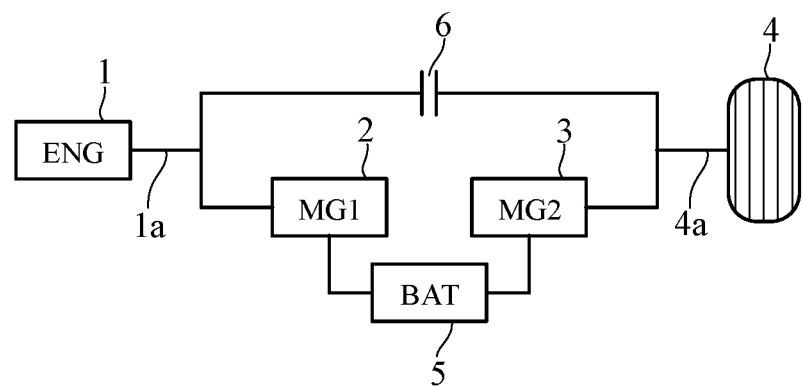
FIG. 1 is a drawing schematically showing the configuration of a travel drive unit of a hybrid vehicle including an internal combustion engine to which a fuel injection control apparatus according to an embodiment of the present invention is applied.

FIG. 1 is a drawing schematically showing the configuration of the travel drive unit of the hybrid vehicle including the internal combustion engine, i.e., the engine to which the fuel injection control apparatus according to the embodiment of the present invention is applied. As shown in FIG. 1, a first motor-generator (MG1) 2 is connected to the output shaft 1a of an engine (ENG) 1, and a second motor-generator (MG2) 3 is connected to the rotation shaft 4a of a drive wheel 4. The first motor-generator 2 mainly serves as a generator that generates power when driven by the engine 1, and the power generated by the first motor-generator 2 is accumulated in a battery (BAT) 5 through an inverter (not shown). The second motor-generator 3 mainly serves as a travel motor that is driven by power supplied from the battery 5 through an inverter (not shown).

A clutch 6 is interposed between the output shaft 1a of the engine 1 and the rotation shaft 4a of the drive wheel 4, and the output shaft 1a and rotation shaft 4a are connected or disconnected through the clutch 6. When the output shaft 1a and rotation shaft 4a are disconnected, the vehicle travels by only the power of the second motor-generator 3 (EV travel). When the output shaft 1a and rotation shaft 4a are connected through the clutch 6, the vehicle travels by only the power of the engine 1 (engine travel) or travels by the power of the engine 1 and second motor-generator 3 (hybrid travel). In other words, the vehicle is able to switch the travel mode among an EV mode, in which EV travel is performed, an engine mode, in which engine travel is performed, and a hybrid mode, in which hybrid travel is performed.

Figure 2:
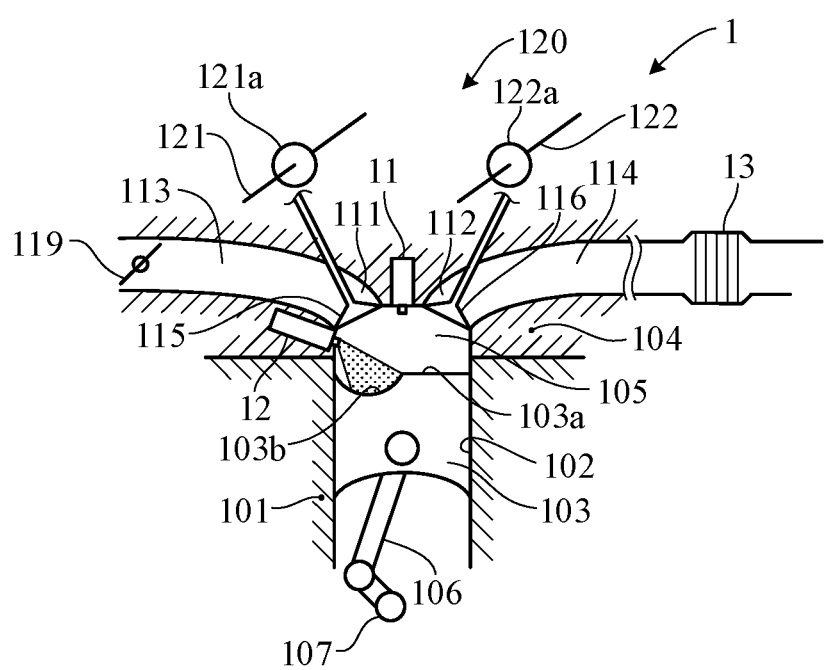
FIG. 2 is a drawing schematically showing a configuration of main components of an engine of FIG. 1.

FIG. 2 is a drawing schematically showing the configuration of main components of the engine 1. The engine 1 is a spark-ignition internal combustion engine having a fuel cut function of stopping supply of fuel to multiple cylinders during deceleration or the like of the vehicle and is a four-stroke engine, which goes through four strokes consisting of intake, compression, expansion and exhaust in one operation cycle. For convenience, a whole of these four strokes is referred to as "one cycle of the combustion of the engine," or simply as "one cycle." For example, the period from the start of the intake stroke to the end of the exhaust stroke or from the start of the exhaust stroke to the expansion stroke is called one cycle. Although the engine 1 includes multiple cylinders, such as four, six, or eight ones, the configuration of one cylinder is shown in FIG. 2. The cylinders have the same configuration.

As shown in FIG. 2, the engine 1 includes a cylinder 102 formed in a cylinder block 101, a piston 103 disposed slidably in the cylinder 102, and a combustion chamber 105 formed between the crown surface 103a of the piston 103 (piston crown surface) and a cylinder head 104. For example, a recess 103b is formed in the piston crown surface 103a so as to be along a tumble flow in the cylinder. The piston 103 is connected to a crankshaft 107 through a connecting rod 106 and rotates the crankshaft 107 (corresponding to the output shaft 1a of FIG. 1) by reciprocating of the piston 103 along the inner wall of the cylinder 102.

The cylinder head 104 is provided with an intake port 111 and an exhaust port 112. An intake passage 113 communicates with the combustion chamber 105 through the intake port 111, while an exhaust passage 114 communicates with the combustion chamber 105 through the exhaust port 112. The intake port 111 is opened and closed by an intake valve 115, and the exhaust port 112 is opened and closed by an exhaust valve 116. A throttle valve 119 is disposed on the upstream side of the intake passage 113 connected to the intake valve 115. The throttle valve 119 consists of, for example, a butterfly valve, and the amount of intake air supplied to the combustion chamber 105 is controlled by the throttle valve 119. The intake valve 115 and exhaust valve 116 are open and close driven by a valve train 120.

An ignition plug 11 and a direct-injection injector 12 are mounted on the cylinder head 104 so as to face the combustion chamber 105. The ignition plug 11 is disposed between the intake port 111 and exhaust port 112 and ignites a fuel-air mixture in the combustion chamber 105 by producing a spark by electrical energy.

The injector 12 is disposed near the intake valve 115. The injector 12 includes a drive portion such as an electromagnetic actuator and piezo actuator, and injects fuel when driven by electrical energy. More specifically, the high-pressure fuel is supplied from a fuel tank to the injector 12 through a fuel pump, and the injector 12 converts the fuel into high fine particles and injects the resulting fuel into the combustion chamber 105 obliquely downward at a predetermined timing. The injector 12 may be disposed otherwise and may be disposed, for example, near the ignition plug 11.

The valve train 120 includes an intake cam shaft 121 and an exhaust cam shaft 122. The intake cam shaft 121 integrally includes intake cams 121a corresponding to the cylinders (cylinders 102), and the exhaust cam shaft 122 integrally includes exhaust cams 122a corresponding to the cylinders. The intake cam shaft 121 and exhaust cam shaft 122 are connected to the crankshaft 107 through timing belts (not shown) and rotate once each time the crankshaft 107 rotates twice.

The intake valve 115 is opened and closed by rotation of the intake cam shaft 121 through an intake rocker arm (not shown) at a predetermined timing corresponding to the profile of the intake cam 121a. The exhaust valve 116 is opened and closed by rotation of the exhaust cam shaft 122 through an exhaust rocker arm (not shown) at a predetermined timing corresponding to the profile of the exhaust cam 122a.

A catalyst device 13 for purifying exhaust gas is disposed on the exhaust passage 114. The catalyst device 13 is a device including a three-way catalyst having a function of removing and purifying HC, CO, and NOx contained in exhaust gas by oxidation and reduction. Other types of catalyst, such as an oxidation catalyst that oxidizes CO and HC in exhaust gas, may be used. When the temperature of the catalyst included in the catalyst device 13 is increased, the catalyst is activated, resulting in an increase in the exhaust gas purification effect of the catalyst device 13.

To improve fuel efficiency, the engine 1 has a fuel cut function of stopping fuel injection from the injector 12 when predetermined fuel cut conditions are satisfied during engine travel. That is, when the fuel cut conditions are satisfied, the mode is switched (referred to as the "F/C mode") and thus fuel injection is stopped. For example, the fuel cut conditions are as follows: the manipulated variable of the accelerator pedal (accelerator opening) is equal to or smaller than a predetermined value; the rotational speed of the crankshaft 107 (engine speed) is equal to or greater than a predetermined value; and the vehicle speed is equal to or greater than a predetermined value. These fuel cut conditions are satisfied, for example, during deceleration travel. In the F/C mode, intake of air into the combustion chamber 105 is continued.

Also, to improve fuel efficiency, the engine 1 has an idling stop function of stopping fuel injection from the injector 12 when predetermined idling stop conditions are satisfied. Specifically, when the idling stop conditions are satisfied, the mode is switched to an idling stop mode (referred to as the "I/S mode") and thus fuel injection is stopped. For example, the idling stop conditions are as follows: the vehicle speed is equal to or lower than a predetermined vehicle speed during a stop or the like of the vehicle; the accelerator pedal is not in operation; and the operation of a brake pedal is detected. In the US mode, the engine 1 is stopping, and intake of air into the combustion chamber 105 is stopped, as during EV travel.

Although not shown, the engine 1 includes an exhaust gas recirculator that recirculates a part of exhaust gas to an intake system, a blow-by gas return device that returns blow-by gas to the intake system and burns it again, a purge controller that controls supply of evaporative fuel gas in a fuel tank to the intake system, and the like. The exhaust gas recirculator includes an internal EGR that recirculates exhaust gas in the combustion chamber 105 under the control of the valve train 120 and an external EGR that guides a part of exhaust gas from the exhaust passage 114 to the intake system through an EGR passage and an EGR valve. The purge controller includes a purge passage through which evaporative fuel gas in the fuel tank is guided to the intake system and a purge valve that is disposed on the purge passage and controls the flow of gas passing through the purge passage. The engine 1 may include a supercharger.

Figure 3:
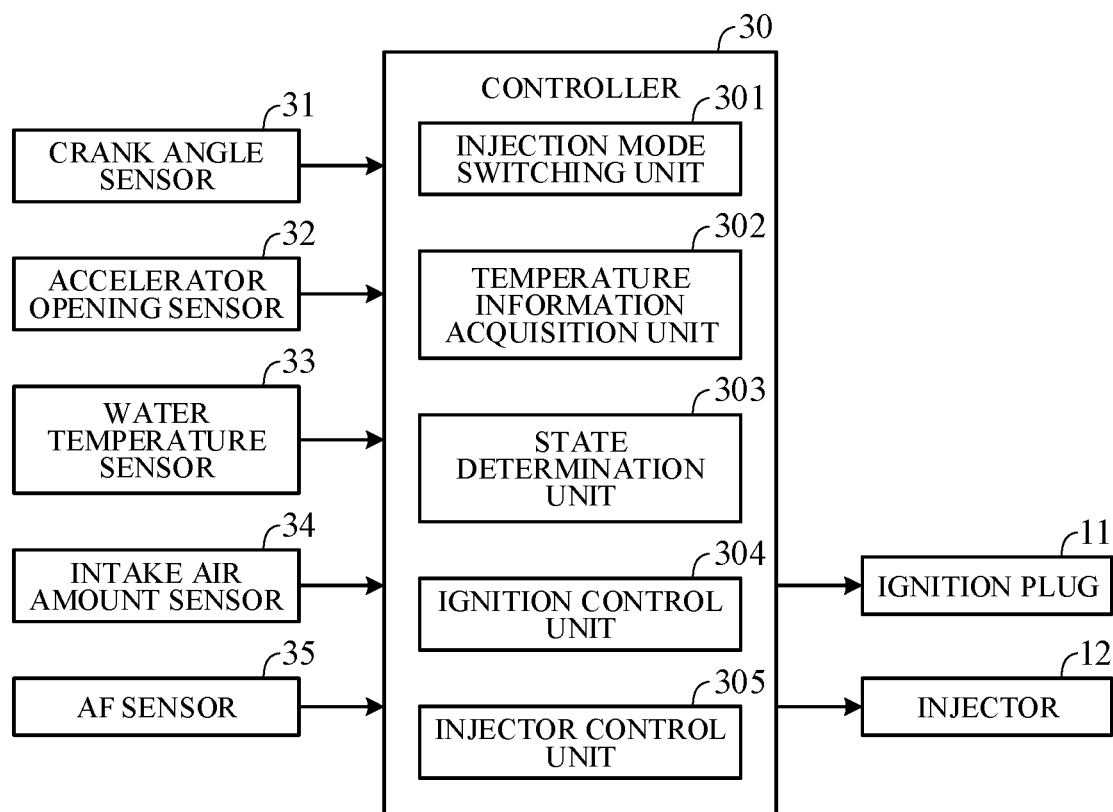
FIG. 3 is a block diagram showing the configuration of main components of an internal combustion engine control apparatus to which the fuel injection control apparatus according to the embodiment of the present invention is applied.

The above engine 1 is controlled by an internal combustion engine control apparatus. FIG. 3 is a block diagram showing the configuration of main components of the internal combustion engine control apparatus according to the embodiment of the present invention. As shown in FIG. 3, the internal combustion engine control apparatus is formed centered on a controller 30 for controlling the engine and includes various types of sensors, actuators, and the like connected to the controller 30. Specifically, a crank angle sensor 31, an accelerator opening sensor 32, a water temperature sensor 33, an intake air amount sensor 34, an AF sensor 35, the ignition plug 11, and the injector 12 are connected to the controller 30.

The crank angle sensor 31 is disposed on the crankshaft 107 and configured to output pulse signals in association with rotation of the crankshaft 107. More specifically, the crank angle sensor 31 output pulse signals every time the crank shaft 10 rotates by a predetermined angle (e.g., 30°). The controller 30 identifies the rotation angle of the crankshaft 107 (crank angle) with respect to the position of the top dead center (TDC) of the piston 103 at the start of the intake stroke and calculates the engine RPM (engine speed) on the basis of pulse signals from the crank angle sensor 31.

The accelerator opening sensor 32 is disposed on the acceleration pedal (not shown) of the vehicle and detects the manipulated variable of the acceleration pedal (accelerator opening). A command indicating the target torque of the engine 1 is issued on the basis of the value detected by the accelerator opening sensor 32. The water temperature sensor 33 is disposed on a passage through which engine cooling water for cooling the engine 1 flows and detects the temperature of the engine cooling water (cooling water temperature). The intake air amount sensor 34 is a sensor that detects the amount of intake air and consists of, for example, an air flow meter disposed on the intake passage 113 (more specifically, on the upstream side of the throttle valve). The AF sensor 35 is disposed on the exhaust passage 114 and on the upstream side of the catalyst device 13 and detects the air-fuel ratio of exhaust gas in the exhaust passage 114. Although not shown, a variety of sensors such as an intake air pressure sensor, atmospheric pressure sensor and intake air temperature other than the above sensors are connected to the controller 30.

The controller 30 consists of an electronic control unit (ECU) and includes a computer including an arithmetic processing unit, such as a CPU, a storage unit, such as a ROM or RAM, and other peripheral circuits. The controller 30 includes, as functional elements, an injection mode switching unit 301, a temperature information acquisition unit 302, a state determination unit 303, an ignition control unit 304, and an injector control unit 305.

Figure 4:
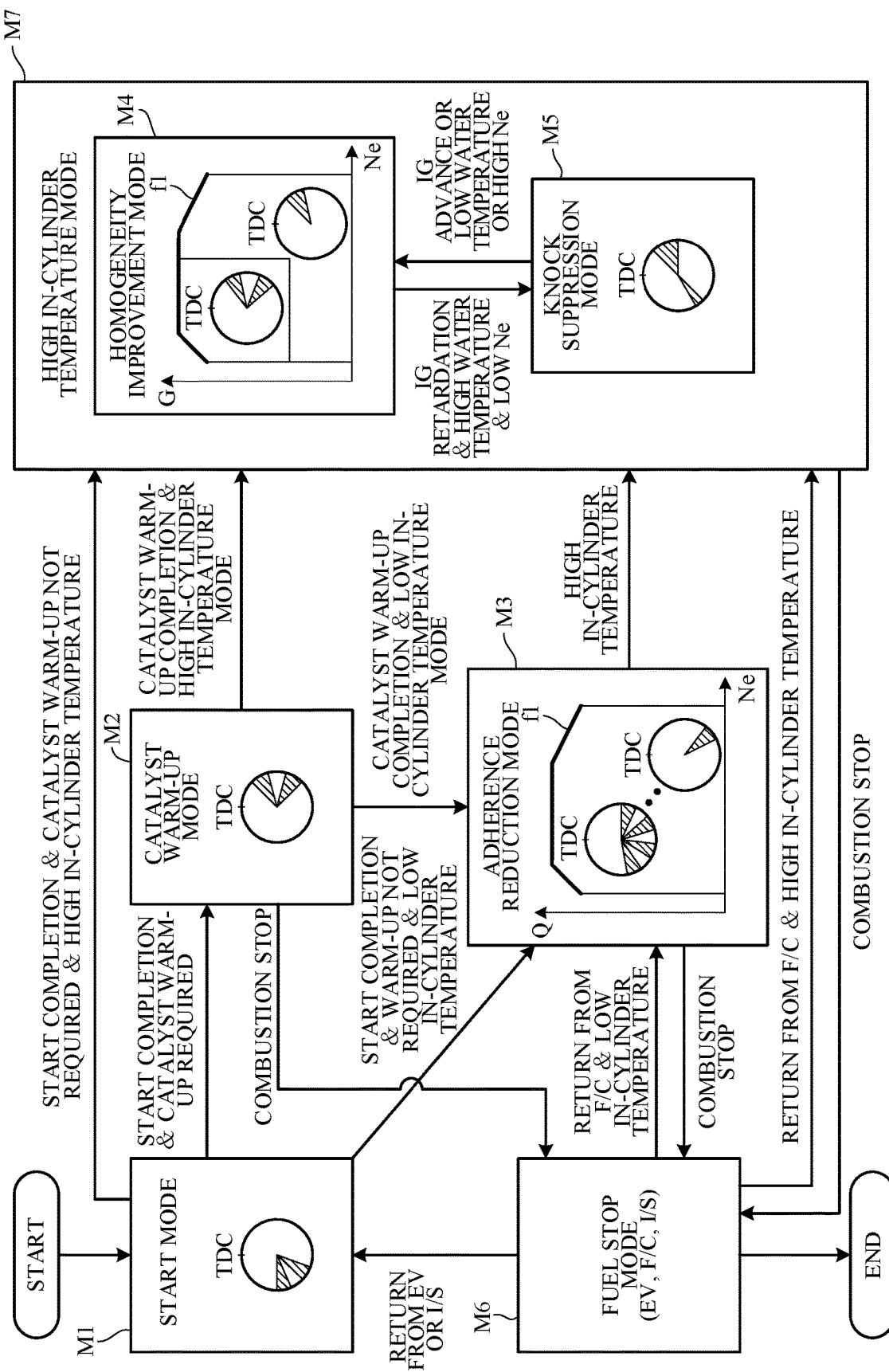
FIG. 4 is a diagram showing an example of switching of injection modes in the internal combustion engine control apparatus of FIG. 3.

The injection mode switching unit 301 switches the injection mode in accordance with the operation state of the engine 1. FIG. 4 is a diagram showing an example of switching of the injection mode in the period from when the operation of the engine 1 is started in response to turn-on of an ignition switch until the operation of the engine 1 is ended in response to turn-off of the ignition switch. As shown in FIG. 4, the injection mode includes a start mode M1, a catalyst warm-up mode M2, an adherence reduction mode M3, a homogeneity improvement mode M4, a knock suppression mode M5, and a fuel stop mode M6. The homogeneity improvement mode M4 and knock suppression mode M5 represent high in-cylinder temperature states, in which the piston temperature (in-cylinder temperature) is high, and are collectively referred to as the "high in-cylinder temperature mode M7."

In the modes M1 to M5 other than the fuel stop mode in FIG. 4, the crank angle in a range from the start of the intake stroke (the intake top dead center (TDC)) to the end of the compression stroke (the compression top dead center (TDC)) is represented by the angle of a clockwise circle using the intake top dead center (TDC) as the start point, and the fuel injection timing is represented by a hatched sector extending radially from the center of the circle. In the intake stroke, the crank angle is in a range equal to or greater than 0° and equal to or smaller than 180°; in the compression stroke, the crank angle is in a range equal to or greater than 180° and equal to or smaller than 360. Hereafter, a crank angle range from 0° to 90° may be referred to as the first half of the intake stroke, a crank angle range from 90° to 180° as the second half of the intake stroke, a crank angle range from 180° to 270° as the first half of the compression stroke, and a crank angle range from 270° to 360° as the second half of the compression stroke.

The start mode M1 is a mode for starting the engine 1 and is performed immediately after the ignition switch is turned on, or when the mode is restored from the EV mode or US mode. In the start mode M1, the engine 1 is cranked and then a mixture is produced by injecting the fuel twice in the first half of the compression stroke, that is, by two-injection compression, as shown in FIG. 4. In this case, the same amount of fuel is injected each time. By injecting the fuel in the compression stroke, the startability of the engine 1 is improved. Also, by injecting the fuel multiple times (in multiple stages) in the first half of the compression stroke, the amount of each fuel injection is suppressed. This allows for suppressing adherence of the fuel to the piston crown surface 103*a* or the wall surface of the cylinder 102 and thus suppressing soot formation.

As long as both an improvement in the startability and suppression of soot are achieved, the start mode M1 is not limited to two-injection compression and may be an injection in a different injection pattern, such as one in which the fuel is injected once in the compression stroke (one-injection compression), one in which the fuel is injected multiple times in the intake stroke and compression stroke (multiple-injection intake-compression), or one which the fuel is injected once or multiple times in the intake stroke. When the start mode M1 is complete, the injection mode is switched to one of the catalyst warm-up mode M2, adherence reduction mode M3, and high in-cylinder temperature mode M7 (e.g., homogeneity improvement mode M4).

The catalyst warm-up mode M2 is a mode for promoting warm-up of the catalyst device 13 to activate the catalyst earlier. In the catalyst warm-up mode M2, a mixture is produced by injecting the fuel twice in the intake stroke, that is, by two-injection intake, as shown in FIG. 4. In this case, the same amount of fuel is injected each time. Also, in the catalyst warm-up mode M2, the timing at which the mixture is ignited by the ignition plug 11 is retarded from the MBT (minimum advance for the best torque), at which the best torque is obtained. The retardation of the ignition timing causes the mixture to be burnt later and thus increases the amount of air supplied to the combustion chamber 105 for generating the target torque and the amount of fuel injection. This increases the amount of heat generated by combustion of the mixture and thus warms up the catalyst device 13 earlier. In the catalyst warm-up mode M2, the fuel is injected at a predetermined timing that is previously stored in the memory and that is not changed in accordance with the engine RPM (engine speed) or the amount of intake air.

By injecting the fuel by two-injection intake in the catalyst warm-up mode M2, the mixture is homogenized, resulting in an increase in the combustion efficiency and suppression of emission deterioration. As long as emission deterioration is suppressed, the catalyst warm-up mode M2 is not limited to two-injection intake and may be an injection in a different injection pattern, such as one in which the fuel is injected once in the intake stroke (one-injection intake) or one in which the fuel is injected multiple times in the intake stroke and compression stroke (multiple-injection intake-compression). When the catalyst warm-up mode M2 is complete, the injection mode is switched to the adherence reduction mode M3 or high in-cylinder temperature mode M7 (e.g., homogeneity improvement mode M4).

The adherence reduction mode M3 is performed in order to reduce soot when the piston temperature is low. In the adherence reduction mode M3, the fuel is injected in an area other than a predetermined injection-prohibited area near the intake top dead center (TDC) at the start of the intake stroke and a predetermined injection-prohibited area near the compression top dead center (TDC) at the end of the compression stroke, that is, in an area in which the piston crown surface 103a is away from the injector 12 (injectable areas). For example, the injection-prohibited area is set in a part or almost all of the first half of the intake stroke and a part or almost all of the second half of the compression stroke.

More specifically, the injection-prohibited area is set in accordance with the engine speed. As the engine speed becomes higher, the piston crown surface 103a retreats from the injector 12 in the intake stroke at a higher speed and approaches the injector 12 in the compression stroke at a higher speed. For this reason, as the engine speed becomes higher, the injection-prohibited area in the intake stroke becomes narrower (the end of the injection-prohibited area is shifted to the advance side), and the injection-prohibited area in the compression stroke becomes wider (the start of the injection-prohibited area is shifted to the retard side).

Figure 5:
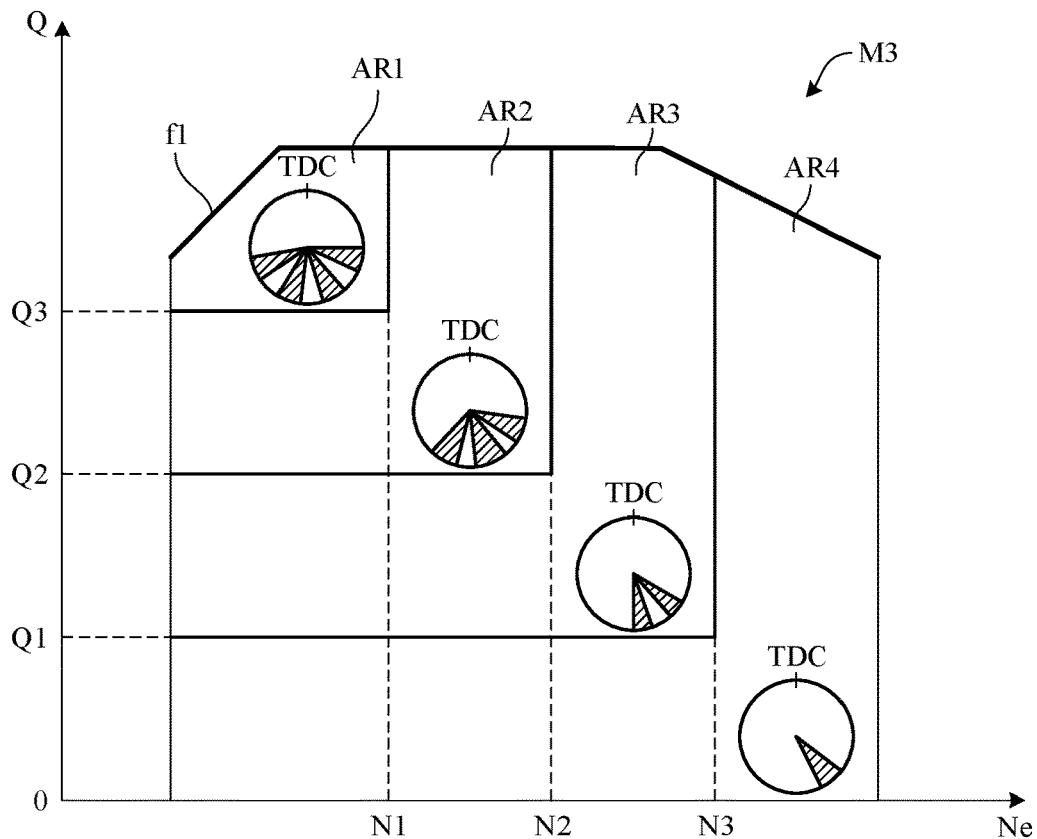
FIG. 5 is a diagram showing an example of an injection map corresponding to an adherence reduction mode of FIG. 4.

The fuel injection frequency and fuel injection timing in the injectable area are determined on the basis of a map previously stored in the memory, for example, a map shown in FIG. 5. Specifically, as shown in FIG. 5, the injection frequency and injection timing are determined on the basis of a predetermined map so as to be associated with a characteristic f1 of the maximum output torque corresponding to the engine speed Ne and the target amount of injection Q, as shown in FIG. 5, and the injection frequency is set to one to four times. If the injection frequency is multiple times, the same amount of fuel is injected each time. The target amount of injection Q is calculated as a value such that the actual air-fuel ratio becomes the target air-fuel ratio and is determined in accordance with the amount of intake air. For this reason, the map of FIG. 5 may be rewritten as a map of the engine speed Ne and the amount of intake air G, like the map of the homogeneity improvement mode M4 of FIG. 4.

To suppress adherence of the fuel to the piston crown surface 103a, it is preferred to reduce the amount of one injection by increasing the injection frequency. However, the minimum amount of one injection Qmin of the injector 12 is defined by the specification of the injector 12, and the injector 12 cannot inject the fuel in a smaller amount than the minimum amount of injection Qmin (MinQ constraint). Accordingly, the injection frequency is once in an area in which the target amount of injection is small, and is gradually increased to twice, three times, and four times as the target amount of injection Q is increased.

On the other hand, to increase the injection frequency, the injector 12 has to be driven at a higher speed. For this reason, for example, a capacitor in an injector driving electrical circuit of the controller 30 has to be repeatedly charged and discharged within a short time. In this case, the injector 12 has to be driven at a higher speed as the engine speed Ne becomes higher. Thus, the controller 30 bears a higher electrical load and generates a greater amount of heat. The injection frequency is limited due to this heat constraint of the controller 30 (ECU heat constraint). That is, while the injection frequency is four times in an area in which the engine speed Ne is low, the injection frequency is gradually limited to three times, twice, and once as the engine speed Ne is increased.

In view of the foregoing, for example, the injection frequency is set to four times (four-stage injection) in an area AR1 in which the engine speed Ne is smaller than a predetermined value N1 and the target amount of injection Q is equal to or greater than a predetermined value Q3; the injection frequency is set to three times (three-stage injection) in an area AR2 in which the engine speed Ne is smaller than a predetermined value N2 and the target amount of injection Q is equal to or greater than a predetermined value Q2, except for the area AR1; the injection frequency is set to twice (two-stage injection) in an area AR3 in which the engine speed Ne is smaller than a predetermined value N3 and the target amount of injection Q is equal to or greater than a predetermined value Q1, except for the areas AR1 and AR2; and the injection frequency is set to once (single injection) in an area AR4 in which the engine speed Ne is equal to or greater than the predetermined value N3 or the target amount of injection Q is smaller than the predetermined value Q1.

The predetermined values N1 to N3 have a relationship of N1<N2<N3, and the predetermined values Q1 to Q3 have a relationship of Q1<Q2<Q3. The predetermined values N1 to N3 and Q1 to Q3 are previously determined through an experiment and stored in the memory. The maximum injection frequency in the adherence reduction mode M3 is determined on the basis of the specification of the injector 12, controller 30, or the like, the mounting position of the injector 12, or the like and may be smaller or greater than four times. When the adherence reduction mode is complete, the injection mode is switched to the high in-cylinder temperature mode M7 (e.g., homogeneity improvement mode M4) or fuel stop mode M6.

The homogeneity improvement mode M4 is an injection mode in which fuel efficiency is optimized. In the homogeneity improvement mode, the fuel is injected by one-injection intake or two-injection intake in accordance with a control map corresponding to the engine speed Ne and the amount of intake air G previously stored in the memory. Specifically, as shown in FIG. 4, the fuel is injected by two-injection intake in a high-load, low-rotation area in which the engine speed Ne is low and the amount of intake air G is large, while the fuel is injected by one-injection intake in an area in which the engine speed Ne is high or the amount of intake air G is small. This control map is changed in accordance with the cooling water temperature. In the case of two-injection intake, the same amount of fuel is injected each time. By injecting the fuel by one-injection intake or two-injection intake in the homogeneity improvement mode, the mixture in the combustion chamber 105 is homogenized by a tumble flow and thus fuel efficiency is increased.

Also, in the homogeneity improvement mode M4, the ignition timing of the ignition plug 11 is controlled mainly in accordance with the engine speed Ne and the amount of intake air G. Specifically, in an area in which knocks do not occur or are less likely to occur, the ignition timing is controlled to the optimum ignition timing, i.e., MBT that is closer to the advance side than the compression top dead center (TDC) and that is previously stored in the memory. On the other hand, in an area in which knocks occur or are more likely to occur, for example, in a high-load, low-rotation area in which the engine speed is low and the amount of intake air is large, the ignition timing is retarded from the MBT in accordance with a characteristic previously stored in the memory in order to suppress knocks. The ignition timing may be retarded by disposing a knock sensor that detects knocks and detecting knocks using the knock sensor. When predetermined knock suppression conditions are satisfied, the homogeneity improvement mode M4 is switched to the knock suppression mode M5.

The knock suppression mode M5 is an injection mode in which knocks are suppressed. In the knock suppression mode M5, the retarded ignition timing is returned (advanced) to the MBT side, and the fuel is injected once in the intake stroke (e.g., in the first half of the intake stroke) and once in the compression stroke (e.g., in the first half of the compression stroke) (multiple-injection intake-compression). In the compression stroke, the amount of injection is the minimum amount of injection Qmin; in the intake stroke, the amount of injection is an amount obtained by subtracting the minimum amount of injection Qmin from the target amount of injection Q. By injecting the fuel in the compression stroke, the temperature of end gas in the combustion chamber 105 is reduced by the latent heat of vaporization.

Thus, knocks are suppressed while the amount of retardation of the ignition timing is suppressed. As a result, fuel efficiency is increased compared to when the ignition timing is retarded and the fuel is injected only in the intake stroke. When the knock suppression node is complete, that is, when the knock suppression conditions become unsatisfied, the injection mode is switched to the homogeneity improvement mode. That is, when the in-cylinder temperature is high (the injection mode is the high in-cylinder temperature mode M7), the injection mode is switched between the homogeneity improvement mode M4 and knock suppression mode M5 in accordance with whether the knock suppression conditions are satisfied.

The fuel stop mode M6 is a mode in which fuel injection is stopped and thus combustion is stopped in the combustion chamber 105. When the travel mode is the EV mode, F/C mode, or I/S mode, the injection mode is switched to the fuel stop mode M6. For example, when combustion is stopped in the adherence reduction mode M3 or high in-cylinder temperature mode M7, the injection mode is switched to the fuel stop mode M6. When the fuel stop mode M6 is complete, the injection mode is switched to one of the start mode M1, adherence reduction mode M3, and high in-cylinder temperature mode M7.

The temperature information acquisition unit 302 of FIG. 3 acquires information on the temperature in the cylinder 102. This temperature information is information on the in-cylinder temperature, which influences adherence of the fuel in the cylinder 102, and corresponds to the temperature of the piston crown surface 103a. For this reason, if a sensor capable of accurately detecting the temperature of the piston crown surface 103a is disposed, the temperature information acquisition unit 302 would only have to acquire information from that sensor. However, the piston crown surface 103a reciprocates in the cylinder 102 so as to face the combustion chamber 105 having a high temperature and therefore it is difficult to directly accurately detect the temperature of the piston crown surface 103a using such a sensor.

On the other hand, the temperature of the piston crown surface 103a has a correlation with the amount of intake air G supplied into the combustion chamber 105 for combustion in the combustion chamber 105. Specifically, when the cumulative amount of the amounts of intake air G is increased, a larger amount of heat is generated in the combustion chamber 105 and thus the temperature of the piston crown surface 103a corresponding to the in-cylinder temperature is increased. For this reason, the temperature information acquisition unit 302 acquires signals from the intake air amount sensor 34 and calculates the cumulative amount of the amounts of intake air G on the basis of the acquired signals.

Figure 6:
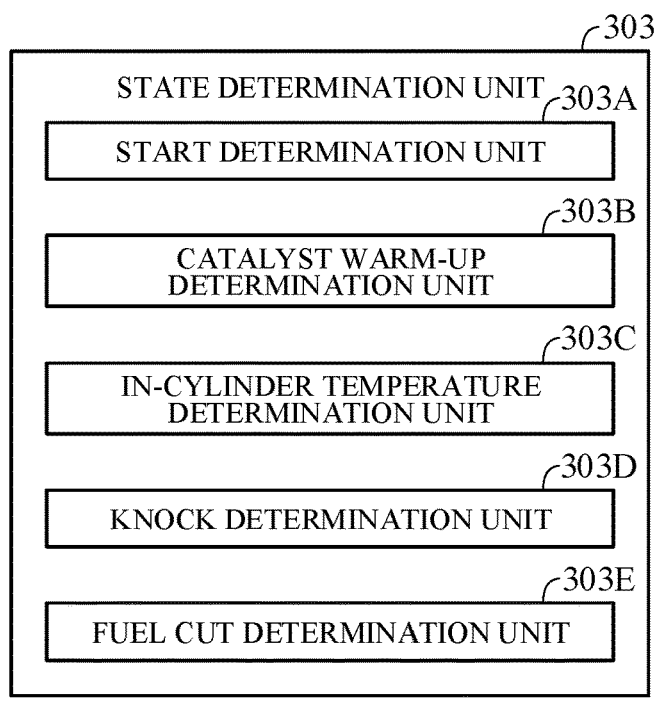
FIG. 6 is a block diagram showing a functional configuration of a state determination unit of FIG. 3.

The state determination unit 303 determines the operation state of the engine 1 related to switching of the injection mode. FIG. 6 is a block diagram showing the functional elements of the state determination unit 303. As shown in FIG. 6, the state determination unit 303 includes a start determination unit 303A, a catalyst warm-up determination unit 303B, an in-cylinder temperature determination unit 303C, a knock determination unit 303D, and a fuel cut determination unit 303E.

In the start mode M1 of FIG. 4, the start determination unit 303A determines whether the start of the engine 1 is complete. Specifically, the start determination unit 303A determines whether the start of the engine 1 is complete, on the basis of whether a predetermined count value has been counted after the rotational speed of the cranked engine calculated on the basis of signals from the crank angle sensor 31 is increased to the complete explosion rotational speed, at which the engine is able to maintain rotation on its own. If the start determination unit 303A determines that the start of the engine 1 is complete, the injection mode switching unit 301 switches the injection mode from the start mode M1 to the catalyst warm-up mode M2, adherence reduction mode M3, or high in-cylinder temperature mode M7 (e.g., homogeneity improvement mode M4).

The start determination unit 303A determines not only whether the start of the engine 1 is complete, but also whether the engine 1 needs to be started. Specifically, in the fuel stop mode M6 of FIG. 4, the start determination unit 303A determines whether the travel mode needs to be switched from the EV mode to the engine mode or hybrid mode and whether the travel mode needs to be restored from the US mode. If the start determination unit 303A determines that the travel mode needs to be switched to the engine mode or that the travel mode needs to be restored from the US mode, the injection mode switching unit 301 switches the injection mode from the fuel stop mode M6 to the start mode M1.

In the catalyst warm-up mode M2 of FIG. 4, the catalyst warm-up determination unit 303B determines whether warm-up of the catalyst device 13 (catalyst warm-up) is complete. This determination is a determination as to whether the total workload of the engine 1 has reached the target total workload required for catalyst warm-up. The target total workload is set in accordance with the cooling water temperature detected by the water temperature sensor 33 at the start of the engine 1 using a previously stored relational expression, characteristic, or map. For example, when the cooling water temperature is low, it takes time to warm up the catalyst, since the engine 1 has yet to be warmed up. In view of the foregoing, the target total workload is set to a larger value as the cooling water temperature is lower.

The catalyst warm-up determination unit 303B first calculates the total workload of the engine 1 corresponding to the cooling water temperature on the basis of signals from the water temperature sensor 33. Subsequently, when the total workload reaches the target total workload, the catalyst warm-up determination unit 303B determines that the catalyst warm-up is complete. Thus, the injection mode switching unit 301 switches the injection mode from the catalyst warm-up mode M2 to the adherence reduction mode M3 or high in-cylinder temperature mode M7 (e.g., homogeneity improvement mode M4).

Also, in the start mode M1 of FIG. 4, the catalyst warm-up determination unit 303B determines whether catalyst warm-up is needed. For example, when the cooling water temperature is high due to restoration from the EV travel, or the like, the catalyst warm-up determination unit 303B sets the target total workload to 0 and determines that catalyst warm-up is not needed. In this case, the injection mode switching unit 301 switches the injection mode from the start mode M1 to the adherence reduction mode M3 or high in-cylinder temperature mode M7 (e.g., homogeneity improvement mode M4). On the other hand, if, in the start mode M1, the catalyst warm-up determination unit 303B sets the target total workload to a value greater than 0 and determines that catalyst warm-up is needed, the injection mode switching unit 301 switches the injection mode from the start mode M1 to the catalyst warm-up mode M2.

The in-cylinder temperature determination unit 303C determines whether the in-cylinder temperature corresponding to the temperature of the piston crown surface 103a is equal to or greater than a predetermined value (e.g., 100° C.), on the basis of the cumulative amount of the amounts of intake air G acquired by the temperature information acquisition unit 302. That is, the in-cylinder temperature determination unit 303C determines whether the in-cylinder temperature is a high in-cylinder temperature equal to or greater than the predetermined value or a low in-cylinder temperature smaller than the predetermined value. In each of the start mode M1, catalyst warm-up mode M2, and fuel stop mode M6 of FIG. 4, the in-cylinder temperature determination unit 303C determines whether the in-cylinder temperature is a high in-cylinder temperature.

In the homogeneity improvement mode M4 of FIG. 4, the knock determination unit 303D determines whether the knock suppression conditions are satisfied. This determination is a determination as to whether the amount of retardation of the ignition timing for suppressing knocks has become equal to or greater than a predetermined value and is a determination as to whether the injection mode needs to be switched to the mode in which knocks are suppressed. When the engine rotational speed (engine speed) is high and when the cooling water temperature is low, knocks are less likely to occur. From this viewpoint, the knock suppression conditions are as follows: the amount of retardation of the ignition timing from the MBT is equal to or greater than a predetermined value; the cooling water temperature is equal to or greater than a predetermined value; and the engine speed is equal to or smaller than a predetermined value. If the knock determination unit 303D determines that the knock suppression conditions are satisfied, the injection mode switching unit 301 switches the injection mode from the homogeneity improvement mode M4 to the knock suppression mode M5.

If, in the knock suppression mode M5, the knock determination unit 303D determines that the knock suppression conditions are unsatisfied, the injection mode switching unit 301 switches the injection mode from the knock suppression mode M5 to the homogeneity improvement mode M4. The injection mode may be switched from the adherence reduction mode M3 to the knock suppression mode M5 without going through the homogeneity improvement mode M4. Specifically, if, in the adherence reduction mode M3, the in-cylinder temperature determination unit 303C determines that the in-cylinder temperature is high, the injection mode may be switched to the knock suppression mode M5.

The fuel cut determination unit 303E determines whether fuel cut is needed in each of the catalyst warm-up mode M2, adherence reduction mode M3, and high in-cylinder temperature mode M7 of FIG. 4. In other words, the fuel cut determination unit 303E determines whether the travel mode needs to be switched to the EV mode, F/C mode, or I/S mode. If the fuel cut determination unit 303E determines that fuel cut is needed, the injection mode switching unit 301 switches the injection mode from the catalyst warm-up mode M2, adherence reduction mode M3, or high in-cylinder temperature mode M7 to the fuel stop mode M6.

The ignition control unit 304 of FIG. 3 outputs control signals to the ignition plug 11 so that the ignition timing becomes the target ignition timing according to a map or characteristic corresponding to the operation state previously stored in the memory. For example, in the catalyst warm-up mode M2, the ignition control unit 304 outputs control signals to the ignition plug 11 so that the ignition timing is retarded from the MBT. In the homogeneity improvement mode M4, the ignition control unit 304 outputs control signals to the ignition plug 11 so that the ignition timing becomes the MBT or is retarded to suppress knocks. In the knock suppression mode M5, the ignition control unit 304 outputs control signals to the ignition plug 11 so that the retarded ignition timing is returned (advanced) to the MBT side.

The injector control unit 305 calculates the target amount of injection per cycle in accordance with the amount of intake air detected by the intake air amount sensor 34 while performing feedback control so that the actual air-fuel ratio detected by the AF sensor 35 becomes the target air-fuel ratio (e.g., a theoretical air-fuel ratio). The injector control unit 305 then calculates the target amount of one injection (the unit target amount of injection) corresponding to the injection mode of FIG. 4 and outputs control signals to the injector 12 so that the injector 12 injects the fuel in the unit target amount at a predetermined timing.

Figure 7:
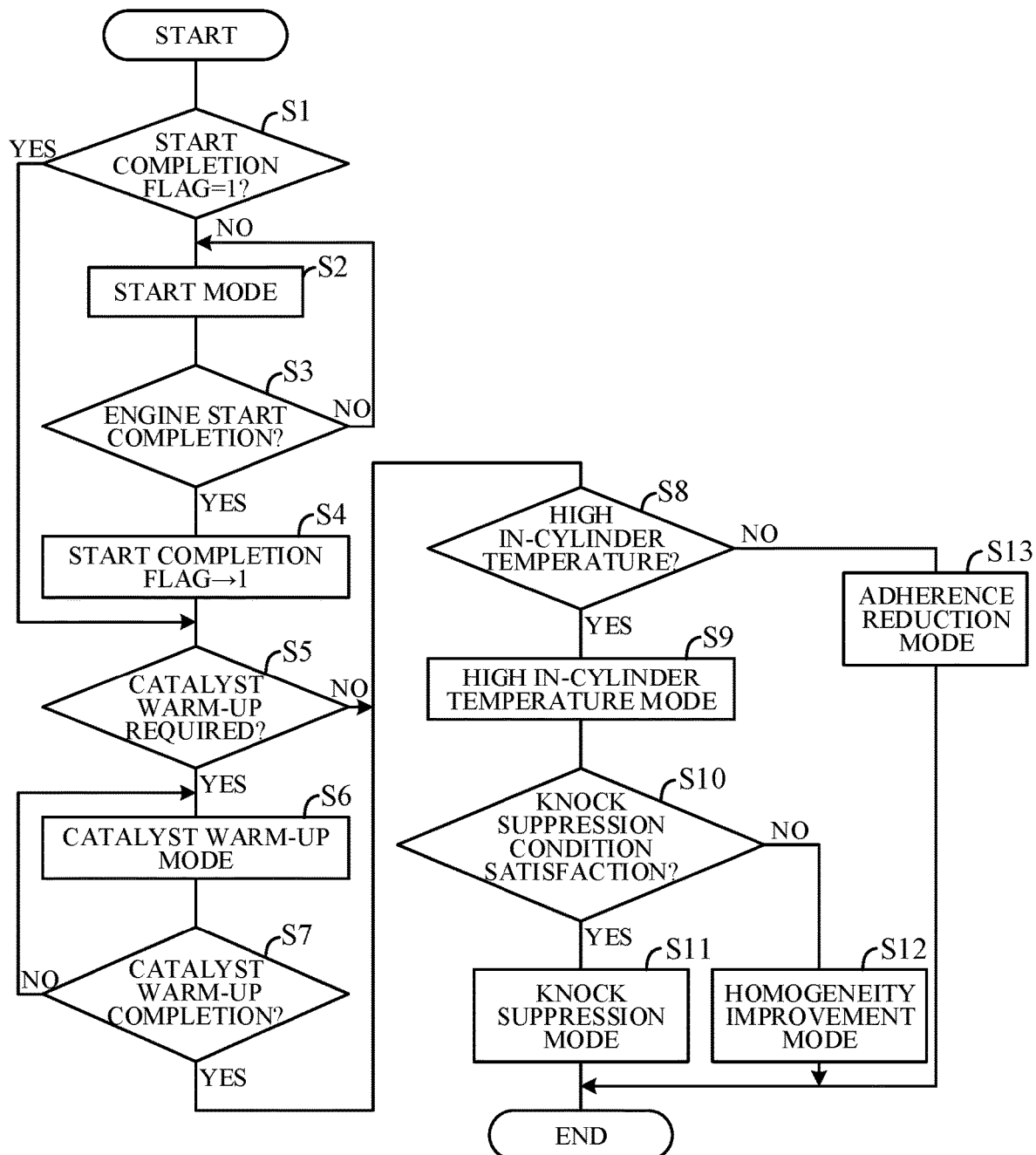
FIG. 7 is a flowchart showing an example of a process performed by a controller in FIG. 3.

FIG. 7 is a flowchart showing an example of a process performed by the controller 30 in accordance with a program previously stored in the memory and, more specifically, an example of a process related to switching of the injection mode. For example, the process shown in this flowchart is started when a command to start the engine 1 is issued in response to turn-on of the ignition switch, and repeated in a predetermined cycle. FIG. 7 does not show a process related to switching from the fuel stop mode M6 of FIG. 4 to any other injection mode or a process related to switching from any other injection mode to the fuel stop mode M6.

As shown in FIG. 7, first, in S1 (S: a process step), the controller 30 determines whether a start completion flag is 1. The start completion flag is 0 at the initial time and is set to 1 when the start of the engine 1 is complete in the start mode M1. If the determination in S1 is NO, the process proceeds to S2; if the determination in S1 is YES, the process skips S2 to S4 and proceeds to S5. In S2, the injection mode is switched to the start mode.

Then, in S3, the controller 30 determines whether the start of the engine 1 is complete, that is, whether the engine speed has reached the complete explosion speed, on the basis of signals from the crank angle sensor 31. If the determination in S3 is YES, the process proceeds to S4; if the determination in S3 is NO, the process returns to S2. In S4, the controller 30 sets the start completion flag to 1.

Then, in S5, the controller 30 determines whether warm-up of the catalyst device 13 is needed, on the basis of whether the target total workload set on the basis of signals from the water temperature sensor 33 is 0. If the determination in S5 is YES, the process proceeds to S6; if the determination in S5 is NO, the process skips S6 and S7 and proceeds to S8. In S6, the controller 30 switches the injection mode to the catalyst warm-up mode M2. In S7, the controller 30 calculates the total workload of the engine 1 on the basis of signals from the intake air amount sensor 34, as well as determines whether catalyst warm-up is complete, on the basis of whether the total workload has reached the target total workload. If the determination in S7 is YES, the process proceeds to S8; if the determination in S7 is NO, the process returns to S6.

In S8, the controller 30 determines whether the in-cylinder temperature is equal to or greater than the predetermined value, that is, whether it is a high in-cylinder temperature, on the basis of the cumulative amount of the amounts of intake air G acquired from the temperature information acquisition unit 302. If the determination in S8 is YES, the process proceeds to S9 and the controller 30 switches the injection mode to the high in-cylinder temperature mode M7.

Then, in S10, the controller 30 determines whether the knock suppression conditions are satisfied, on the basis of the amount of retardation of the ignition timing from the MBT, the cooling water temperature detected by the water temperature sensor 33, and the engine speed detected by the crank angle sensor 31. If the determination in S10 is YES, the process proceeds to S11; if the determination in S10 is NO, the process proceeds to S12. In S11, the injection mode is switched to the knock suppression mode M5; in S12, the injection mode is switched to the homogeneity improvement mode M4. On the other hand, if the determination in S8 is NO, the process proceeds to S13 and the injection mode is switched to the adherence reduction mode M3.

The main operation of the above internal combustion engine control apparatus will be described more specifically. When the ignition switch is turned on, the fuel is injected by two-injection compression and the engine 1 is started (S2). If the cooling water temperature is low due to the first start of the engine 1, or the like, warm-up of the catalyst device 13 is needed and the fuel is injected by two-injection intake (S6). Thus, the ignition timing is retarded from the MBT so that the mixture is burnt later, allowing the catalyst device 13 to be warmed up earlier.

After the warm-up of the catalyst device 13 is complete (e.g., immediately after completion of the warm-up following the first start of the engine 1), the in-cylinder temperature may have yet to be increased to a predetermined temperature (e.g., 100° C.) required to reduce adherence of soot to the piston crown surface 103a. In this case, the fuel is injected in accordance with the map of FIG. 5 in a range from the second half of the intake stroke to the first half of compression stroke so that a reduction in adherence of soot is preferentially performed (S13). Thus, for example, the fuel is injected four times in a high-load, low-rotation area AR1. As a result, the amount of one fuel injection of the injector 12 is reduced and thus adherence of the fuel is effectively suppressed.

On the other hand, if the in-cylinder temperature after completion of the warm-up of the catalyst device 13 is equal to or greater than a predetermined temperature, soot is less likely to occur. This is because even if the fuel adheres to the piston crown surface 103a, the fuel instantly evaporates. In this case, the fuel is injected in the intake stroke (by two-injection intake or one-injection intake) (S12). Thus, the mixture in the combustion chamber 105 is homogenized, resulting in an increase in the combustion efficiency. The fuel is injected by two-injection intake also during catalyst warm-up. However, the above fuel injection in the intake stroke (at high in-cylinder temperature state) is performed at a timing different from that during catalyst warm-up.

If the knock suppression conditions are satisfied when the fuel is being injected in the intake stroke in a high in-cylinder temperature state, the fuel is injected in the intake stroke and the fuel of the minimum amount Qmin is also injected in the compression stroke (S11). Thus, the temperature of the mixture is reduced, resulting in suppression of knocks. As a result, the amount of retardation of the ignition timing for suppressing knocks is reduced, and the ignition timing approaches the MBT. Thus, the combustion efficiency is increased.

When the engine 1 is started due to restoration from the EV mode or US mode, or the like, the cooling water temperature may be sufficiently high. In this case, the injection mode is switched to the high in-cylinder temperature mode M7 (e.g., homogeneity improvement mode M4) or adherence reduction mode M3 (S5→S8→S9, S5→S8→S13) without warming up the catalyst device 13 after the start of the engine. Thus, efficient combustion is performed after the start of the engine while adherence of soot to the piston crown surface 103a is suppressed.

Given the above configuration, the fuel injection control apparatus according to the embodiment of the present invention will be described. To cause the injector 12 to inject the fuel, the injection pattern is determined in accordance with the injection mode switched by the injection mode switching unit 301, as described above. Also, the target injection time required to inject the fuel in the target amount determined in accordance with the amount of intake air and the like is calculated. Then, control signals are outputted to the injector 12 (to be more precise, the drive circuit of the injector 12) so that the fuel is injected for the target injection time from a predetermined target crank angle (target injection start timing) determined in accordance with the injection pattern.

Given the above configuration, the fuel injection control apparatus according to the embodiment of the present invention will be described. To cause the injector 12 to inject the fuel, the injection pattern is determined in accordance with the injection mode switched by the injection mode switching unit 301, as described above. Also, the target injection time required to inject the fuel in the target amount determined in accordance with the amount of intake air and the like is calculated. Then, control signals are outputted to the injector 12 (to be more precise, the drive circuit of the injector 12) so that the fuel is injected for the target injection time from a predetermined target crank angle, more specifically, from a target injection start timing corresponding to the predetermined target crank angle determined in accordance with the injection pattern.

For example, when injecting the fuel in the intake stroke, the controller 30 (FIG. 3) calculates the target amount of injection from information, such as the amount of intake air detected by the intake air amount sensor 34, that is, the amount of intake air and the like obtained at the start of the intake stroke of the cylinder 102, into which the fuel is to be injected. However, the time point at which the calculation of the target amount of injection during the intake stroke is completed may be delayed due to an increase in the processing load of the controller 30, or the like. Thus, the time point at which the calculation of the target amount of injection is completed may lag behind the target fuel injection start timing, resulting in a failure to inject the fuel at a predetermined timing. To avoid this, in the present embodiment, the target amount of injection and the like are calculated not only during the intake stroke but also during the exhaust stroke.

Figure 8A:
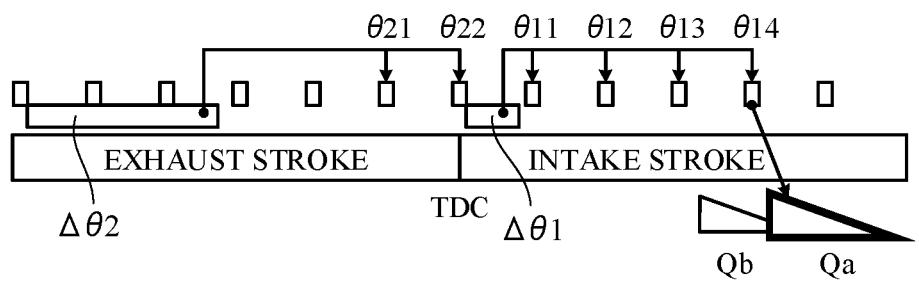
FIG. 8A is a diagram showing an example of a calculation time for calculating a target amount of injection in a case of injecting the fuel in an intake stroke.
Figure 8B:
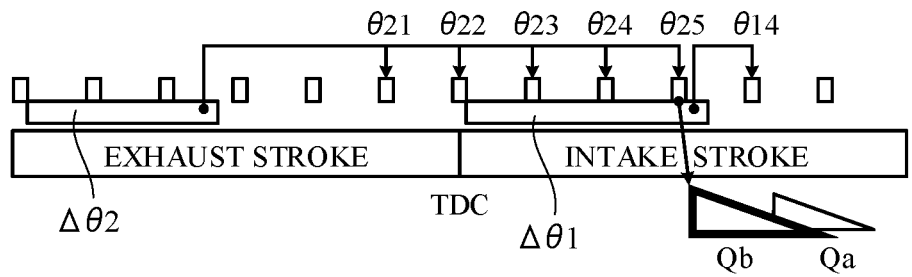
FIG. 8B is a diagram showing another example of the calculation time for calculating the target amount of injection in the case of injecting the fuel in the intake stroke.

FIGS. 8A and 8B are diagrams showing the timing at which the controller 30 calculates the target amount of injection in a case of injecting the fuel in the intake stroke. As shown in FIG. 8A, when the intake top dead center TDC is detected by the crank angle sensor 31, the controller 30 calculates the target amount of injection and the target injection start crank angle with reference to a previously stored map or the like on the basis of parameters obtained at the start of the intake stroke. The time taken for the calculation (referred to as the calculation time) is represented by a crank angle range 401.

Each time a crank angle $\theta$ is changed by 30° in the intake stroke, the controller 30 calculates the injection start timing on the basis of the engine speed detected by the crank angle sensor 31 and injects the fuel for the target injection time corresponding to the target amount of injection. In FIG. 8A, the injection start timing is calculated at crank angles $\theta 11$, $\theta 12$, $\theta 13$, and $\theta 14$, and the fuel in the target amount (target amount of injection) Qa is injected at the injection start timing (target crank angle) using the crank angle $\theta 14$ as a reference.

The controller 30 calculates the target amount of injection also during the stroke preceding the intake stroke, that is, during the exhaust stroke. Specifically, the controller 30 calculates the target amount of injection and the target injection start crank angle with reference to a previously stored map or the like on the basis of parameters obtained at the start of the exhaust stroke. The time taken for the calculation (referred to as the calculation time) is represented by a crank angle range $\Delta\theta 2$.

The controller 30 calculates the injection start timing on the basis of the engine speed detected by the crank angle sensor 31, each time the crank angle is changed by 30°, from a crank angle $\theta 21$ before the intake top dead center TDC by 30°. This calculation is continued until the calculation of the target amount of injection performed in the intake stroke completes. In FIG. 8A, the injection start timing is calculated at crank angles $\theta 21$ and $\theta 22$. The target amount of injection calculated during the exhaust stroke is shown as Qb and there is a difference between the injection start timings of Qb and Qa, which is calculated during the intake stroke.

FIG. 8A shows a case in which the calculation of the target amount of injection is completed earlier during the intake stroke, that is, a case in which the crank angle range $\Delta\theta 1$ is smaller. On the other hand, FIG. 8B shows a case in which the calculation of the target amount of injection is completed later during the intake stroke and the crank angle range $\Delta\theta 1$ is greater. In FIG. 8B, the injection start timing is calculated at crank angles $\theta 21$, $\theta 22$, $\theta 23$, $\theta 24$, and $\theta 25$ on the basis of the target amount of injection calculated during the exhaust stroke. The injection start timing is calculated at the crank angle $\theta 14$ on the basis of the target amount of injection calculated during the intake stroke. However, the target injection start crank angle is before $\theta 14$. i.e., between $\theta 25$ and $\theta 14$. Accordingly, the fuel in the target amount of injection Qb calculated during the exhaust stroke is injected at the injection start timing based on this target amount of injection.

As described above, the target amount of injection is calculated also in the exhaust stroke, and the injection start timing is calculated each time the crank angle is changed by 30° from the predetermined crank angle $\theta 21$. Thus, even if the calculation is completed later during the intake stroke, the fuel in the target amount Qb is injected at the target crank angle. However, to perform multi-stage injection (split injection) after recovering from the F/C mode, it is necessary to make predetermined intervals between the injections. This increases the injection time per combustion cycle (the time from the start of the first injection to the end of the last injection), which may result in a failure to inject the fuel in the target amount Qb. This will be described with reference to FIG. 9.

Figure 9:
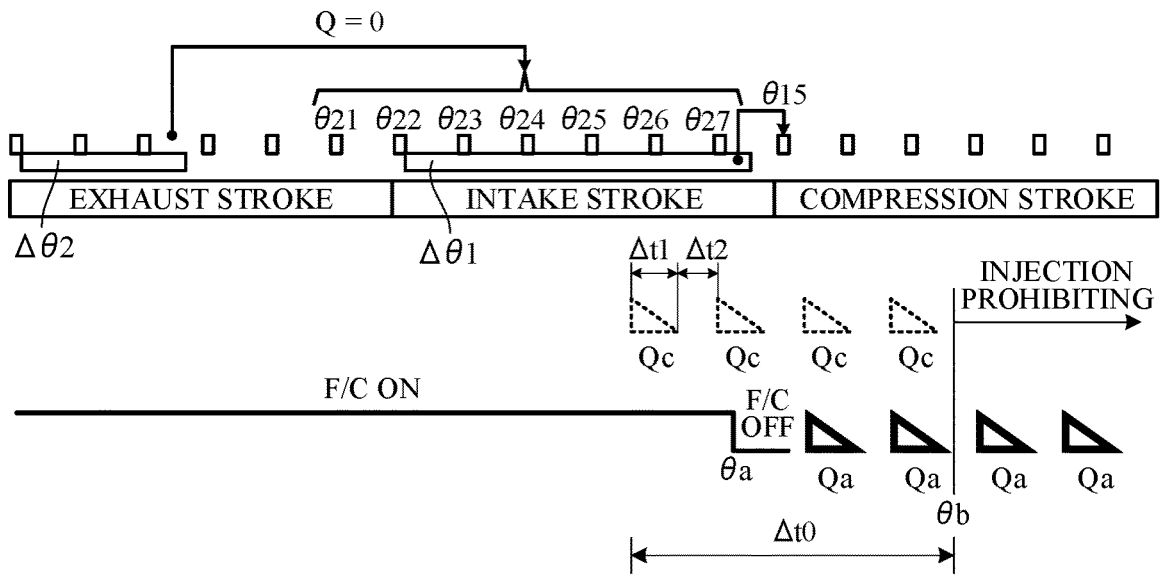
FIG. 9 is a diagram showing an example of the calculation time for calculating the target amount of injection in the case of injecting the fuel in the intake stroke after been recovered from a fuel cut.

FIG. 9 shows an example in which the fuel cut recovery condition is satisfied during travel in the F/C mode and the injection mode is switched from the F/C mode (F/C ON) to another mode in which fuel injection is started, for example, the adherence reduction mode M3 (F/C OFF), at a crank angle $\theta a$. The fuel cut recovery condition is, for example, that the engine speed is reduced to a predetermined value or less or that depression of an accelerator pedal is started. Note that when recovering from the fuel cut state, the injection mode may be switched to the homogeneity improvement mode M4 or the like. In FIG. 9, the fuel in the target amount Qc is injected twice in the intake stroke and twice in the compression stroke when recovering (before and after recovering) from the fuel cut state (dotted triangles). The second half (crank angle $\theta b$ and later) of the compression stroke is an injection-prohibited area, in which fuel injection is prohibited.

If the calculation of the target amount of injection during the intake stroke is completed later and the crank angle range 401 corresponding to the calculation time is increased, the injection start timing is calculated at the crank angles $\theta 21$, $\theta 22$, . . . , and $\theta 27$ on the basis of the target amount of injection calculated in the crank angle range $\Delta\theta 2$ during the exhaust stroke. However, the target amount of injection in the F/C mode is 0. Accordingly, the target amount of injection at the crank angles $\theta 21$, $\theta 22$, . . . , and $\theta 27$ is 0, and the target amount of injection Qc at the target crank angle between the crank angles $\theta 25$ and $\theta 26$ is also 0. Even if the injection mode is switched to the F/C mode at the crank angle θa, the target amount of injection remains 0 unless the calculation of the target amount of injection during the intake stroke is completed.

When the calculation of the target amount of injection during the intake stroke is completed after the completion of the F/C mode, the injection start timing is calculated at the crank angle θ15 on the basis of the target amount of injection. However, injection of the fuel in the target amount Qa in multiple stages at the crank angle immediately following the crank angle θ15 (solid triangles) and later crank angles is prohibited. This is because the ignition timings would overlap the injection-prohibited area. While the start of fuel injection needs to be delayed by one combustion cycle, doing so delays the fuel cut recovery timing and reduces the product marketability. To solve the above problem, the fuel injection control apparatus according to the present embodiment is configured as follows.

Figure 10:
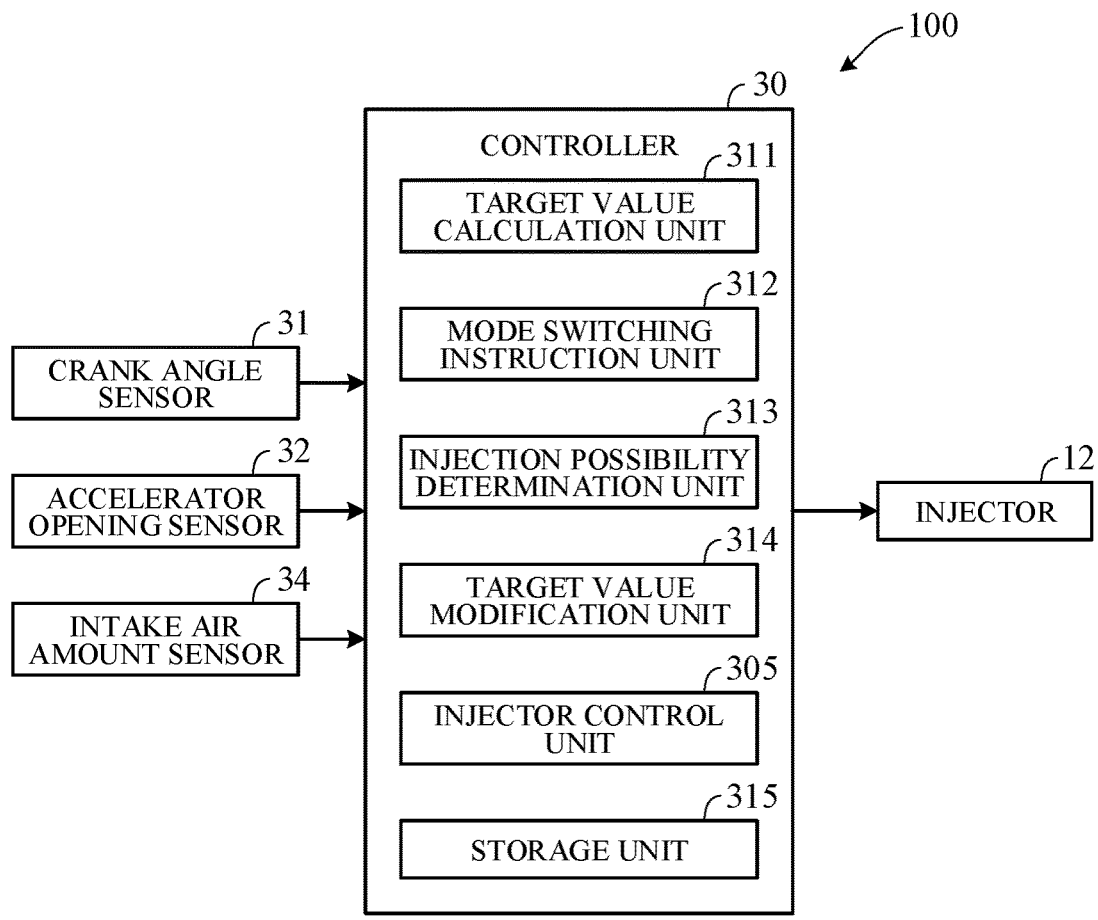
FIG. 10 is a block diagram showing a main configuration of the fuel injection control apparatus according to the embodiment of the invention.

FIG. 10 is a block diagram showing the configuration of main components of the fuel injection control apparatus 100 according to the present embodiment. Some elements of the fuel injection control apparatus 100 are the same as those of the control apparatus of FIG. 3 and are given the same reference signs. As shown in FIG. 10, the fuel injection control apparatus 100 includes the controller 30, as well as the crank angle sensor 31, accelerator opening sensor 32, intake air amount sensor 34, and injector 12 that are connected to the controller 30.

The controller 30 also includes, as functional elements, a target value calculation unit 311, a mode switching instruction unit 312, an injection possibility determination unit 313, a target value modification unit 314, an injector control unit 305, and a storage unit 315. The storage unit 315 stores maps representing injection patterns corresponding to the engine speed and the amount of intake air or the target amount of injection. For example, the storage unit 315 stores a map representing the injection pattern of the adherence reduction mode M3 or homogeneity improvement mode M4 switched from the F/C mode (fuel stop mode M6). The stored maps include information on the target injection frequency, target injection start timing, and injection-prohibited area.

The target value calculation unit 311 calculates the injection target values per combustion cycle in the injectable area at a predetermined timing with reference to a map or the like stored in the storage unit 315 on the basis of signals representing the operation state of the engine 1 from the sensors, such as the crank angle sensor 31 and intake air amount sensor 34. More specifically, the target value calculation unit 311 calculates the target amount of injection and target crank angle after the start of the exhaust stroke (crank angle range Δθ2), as well as calculates the target amount of injection and target crank angle after the start of the intake stroke (crank angle range Δθ1). The injection target values also include the target injection frequency, and the target value calculation unit 311 also determines the target injection frequency in accordance with the injection mode.

The target value calculation unit 311 also calculates the target injection start timing and target injection time at crank angles in steps of 30° starting from the crank angle θ21 before the intake top dead center TDC by a predetermined crank angle of 30°. That is, once the calculation of the target amount of injection in the crank angle range Δθ2 during the exhaust stroke is completed, the target value calculation unit 311 calculates the target injection start timing and target injection time using the values (the target amount of injection and target crank angle) calculated during the exhaust stroke until the calculation of the target amount of injection in the crank angle range 401 during the intake stroke is completed. Once the calculation of the target amount of injection in the crank angle range Δθ1 during the intake stroke is completed, the target value calculation unit 311 calculates the target injection start timing and target injection time using the values (the target amount of injection and target crank angle) calculated during the intake stroke.

The mode switching instruction unit 312 issues a command to switch the injection mode from the F/C mode to another injection mode in which fuel injection is performed (e.g., adherence reduction mode M3 or homogeneity improvement mode M4) and a command to switch the injection mode from the other injection mode to the F/C mode. Specifically, if the fuel cut condition is satisfied and the fuel cut determination unit 303E (FIG. 6) determines that fuel cut is needed, the mode switching instruction unit 312 instructs to switch the injection mode to the F/C mode. On the other hand, if the accelerator opening sensor 32 detects a predetermined depression of the accelerator pedal in the F/C mode, or if the engine speed detected by the crank angle sensor 31 is reduced to the predetermined value or less, the mode switching instruction unit 312 determines that the fuel cut recovery condition has been satisfied and instructs to switch the injection mode from the F/C mode to another injection mode. Note that to which injection mode the F/C mode should be switched is determined on the basis of the in-cylinder temperature or the like.

The injection possibility determination unit 313 determines whether the fuel in the target amount of injection included in the injection target values calculated by the target value calculation unit 311 can be injected in the injectable area except for the injection-prohibited area. If the injection pattern for injecting the fuel in the target amount is multi-stage injection (split injection), it is necessary to make an interval having a predetermined length for each injection for the purposes, such as ensuring of the time for increasing the voltage of the driver circuit of the injector 12. For example, in the case of four-stage injection shown in FIG. 9, it is necessary to make an interval having a predetermined length of Δt2 for each injection. Assuming that the time required for one injection is Δt1, the total injection time Δt0 per cycle of four-stage injection is 4×Δt1+3×Δt2.

The target value calculation unit 311 calculates the injection time Δt0 (target injection time) per cycle corresponding to the target amount of injection and calculates the injection end timing by adding the target injection time Δt0 to the injection start timing. The injection possibility determination unit 313 determines whether the fuel in the target amount can be injected in the injectable area by determining whether the crank angle at the injection end timing falls within the injectable area.

If the injection possibility determination unit 313 determines that the fuel in the target amount cannot be injected in the injectable area, the target value modification unit 314 reduces the target injection frequency of multi-stage injection to once. Specifically, the target value modification unit 314 modifies the injection target value by changing the target injection frequency (e.g., four times) included in the injection target values calculated by the target value calculation unit 311 to once. This eliminates the need to make an interval for each injection and thus reduces the target injection time from the Δt0 to Δt0a. For example, in the case of four-stage injection, the target injection time Δt0a becomes 4×Δt1.

The target value calculation unit 311 recalculates the injection end timing by adding the target injection time Δt0a to the injection start timing. The injection possibility determination unit 313 again determines whether the crank angle at this injection end timing falls within the injectable area, that is, whether the injection area (crank angle) needed for single injection falls within the injectable area.

If the injection possibility determination unit 313 determines that the fuel can be injected in the injectable area for the target injection time $\Delta t0$, the injector control unit 305 outputs control signals to the injector 12 so that the fuel is injected at the target injection frequency (e.g., four times) from the injection start timing calculated by the target value calculation unit 311. In this case, the amount of one injection (the unit target amount of injection) corresponds to a value obtained by dividing the target amount of injection per cycle by the injection frequency. On the other hand, if the injection possibility determination unit 313 determines that multi-stage injection is impossible but single injection is possible, the injector control unit 305 outputs control signals to the injector 12 so that the fuel is injected once at the injection start timing calculated by the target value calculation unit 311. In this case, the amount of one injection corresponds to the target amount of injection per cycle.

Figure 11:
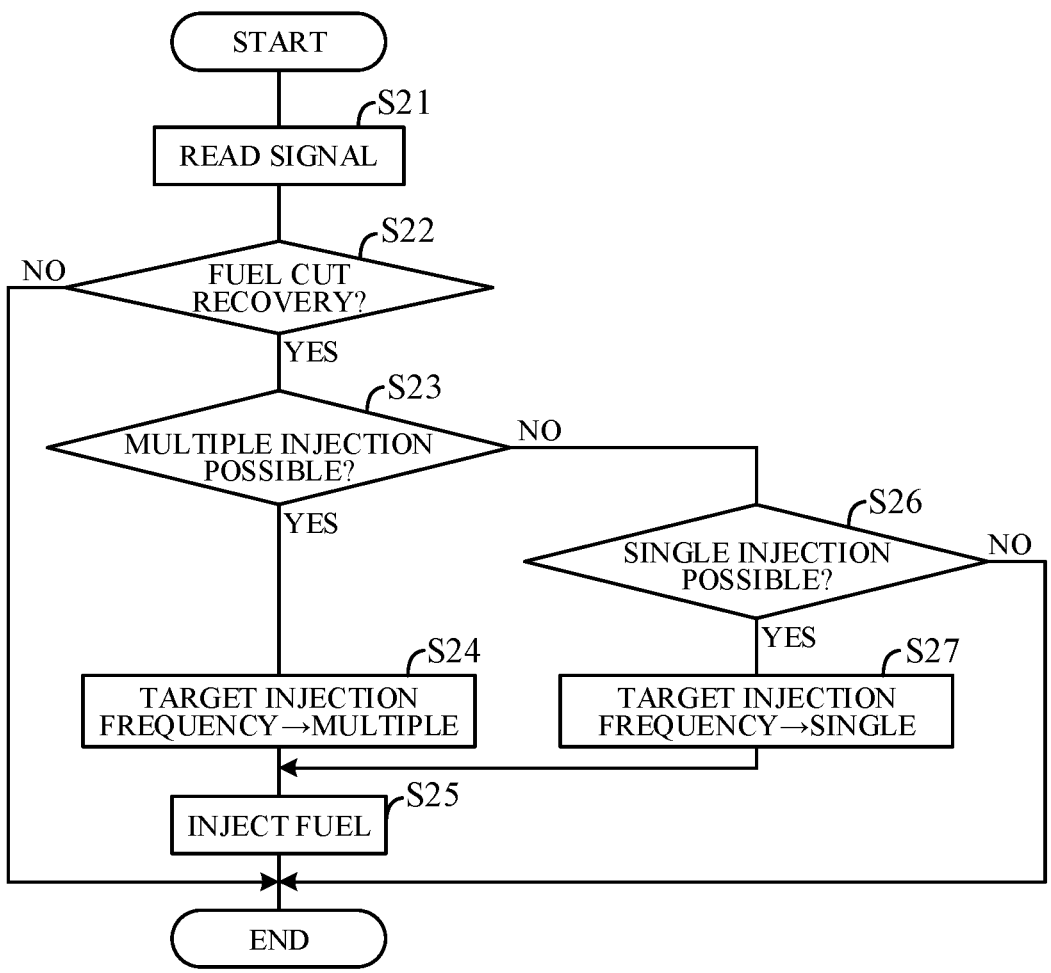
FIG. 11 is a flowchart showing an example of a process performed by a controller in FIG. 10.

FIG. 11 is a flowchart showing an example of a fuel injection-related process performed by the controller 30 and, more specifically, a process performed by the elements other than the target value calculation unit 311. For example, the process shown in this flowchart is started when the injection mode is the F/C mode, and repeated in a predetermined cycle. Note that, as described above, the target value calculation unit 311 performs a different process at a predetermined timing. The flowchart will be described assuming that the initial target injection frequency included in the injection target values calculated by the target value calculation unit 311 is multiple times (e.g., four times).

First, in S21, the controller 30 reads signals from the sensors 31, 32, and 34 and the target value calculation unit 311. Then, in S22, the controller 30 determines whether the fuel cut recovery condition is satisfied, on the basis of the signals from the crank angle sensor 31 and accelerator opening sensor 32. If the determination in S22 is YES, the process proceeds to S23; if the determination in S22 is NO, the process is ended. In S23, the controller 30 determines whether multi-stage injection is possible after recovering from the F/C mode, that is, whether the crank angle at the injection end timing falls within the injectable area when performing multi-stage injection.

If the determination in S23 is YES, the process proceeds to S24. The controller 30 sets the target injection frequency (multiple times) included in the injection target values calculated by the target value calculation unit 311 as the target injection frequency as it is. Then, in S25, the controller 30 outputs control signals to the injector 12 so that the fuel in the unit target amount is injected at the target injection frequency from the injection start timing at predetermined intervals.

On the other hand, if the determination in S23 is NO, the process proceeds to S26. The controller 30 determines whether single injection is possible after recovering from the F/C mode, that is, whether the crank angle at the injection end timing falls within the injectable area when performing single injection. If the determination in S26 is YES, the process proceeds to S27; if the determination in S26 is NO, the process is ended. In S27, the controller 30 changes the target injection frequency included in the injection target values calculated by the target value calculation unit 311 to once (single). Then, in S25, the controller 30 outputs control signals to the injector 12 so that the fuel in the target amount is injected once at the injection start timing.

FIG. 11 is a flowchart showing a process performed immediately after the recovery from the F/C mode. Accordingly, when S25 is complete, the process of FIG. 11 is ended.

The operation of the fuel injection control apparatus according to the present embodiment will be described more specifically. If the fuel cut recovery condition is satisfied, for example, due to an operation of the accelerator pedal, during travel in the F/C mode, the controller 30 calculates the target amount of injection and injection start timing in accordance with the amount of intake air, engine speed, and the like, as well as determines the target injection frequency (e.g., four times) in accordance with the injection mode. If the crank angle at the injection end timing falls within the injectable area, the fuel is injected in multiple stages in accordance with the injection target values (S24→S25).

Figure 12:
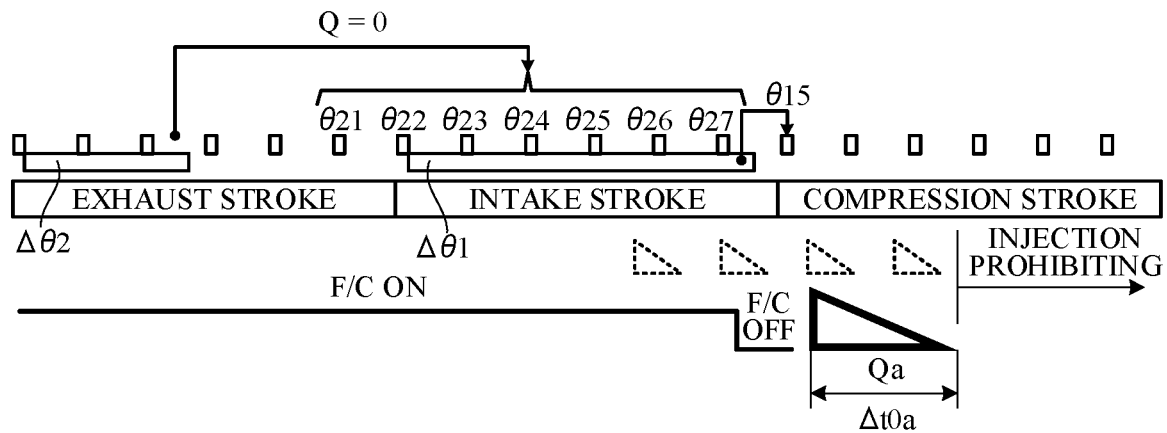
FIG. 12 is a diagram showing an example of an operation by the fuel injection control apparatus according to the embodiment of the invention.

On the other hand, if multi-stage injection is impossible due to a delay in the calculation during the intake stroke as shown in FIG. 9 (solid triangles in FIG. 9), the target injection frequency is changed to once. Thus, as shown in FIG. 12, the target injection time is reduced from $\Delta t0$ to $\Delta t0a$, and the fuel in the target amount Qa is injected by single injection (S27→S25). Thus, the fuel cut recovery timing is prevented from being delayed by one cycle, allowing for an increase in the product marketability. Although the ignition timing is retarded to reduce shock when recovering from the F/C mode, this will not be described.

The present embodiment can achieve advantages and effects such as the following:

(1) The fuel injection control apparatus 100 is applied to the engine 1 including the piston 103 that reciprocates in the cylinder 102 and the injector 12 that injects the fuel into the combustion chamber 105 facing the piston 103 in the cylinder 102. The fuel injection control apparatus 100 includes: the target value calculation unit 311 that calculates the injection target values including the target amount of injection, the target injection timing, and the target injection frequency per combustion cycle in the crank angle injectable area on the basis of the operation state of the engine 1; the injector control unit 305 that controls the injector 12 so that the injector 12 injects the fuel in accordance with the injection target values calculated by the target value calculation unit 311; the mode switching instruction unit 312 that instructs to switch the injection mode from a first mode, such as the adherence reduction mode M3 or homogeneity improvement mode M4, in which the fuel is injected into the combustion chamber 105, to the F/C mode (second mode), in which fuel injection into the combustion chamber 105 is stopped, and instructs to switch the injection mode from the second mode to the first mode; the injection possibility determination unit 313 that, when the mode switching instruction unit 312 instructs to switch the injection mode from the second mode to the first mode, determines whether the fuel can be injected in the injectable area in accordance with the injection target values calculated by the target value calculation unit 311; and the target value modification unit 314 that, when the target injection frequency included in the injection target values calculated by the target value calculation unit 311 is multiple times (e.g., four times) and when the injection possibility determination unit 313 determines that fuel injection according to the injection target values is impossible, modifies the injection target value by reducing the target injection frequency to once (FIG. 10). When the target value modification unit 314 modifies the injection target value, the injector control unit 305 controls the injector 12 so that the injector 12 injects the fuel in accordance with the modified injection target value (the target injection frequency is once).

This configuration allows single injection to be performed when split injection cannot be performed due to the limit of the injectable area when recovering from the F/C mode. Thus, the fuel cut recovery timing is advanced. This allows the engine 1 to immediately output a torque in response to the driver operating the accelerator pedal, and the driver does not have a feeling of strangeness with respect to the behavior of the vehicle. As a result, the product marketability of the vehicle is increased.

(2) When starting fuel injection in the intake stroke among the exhaust stroke, intake stroke, compression stroke, and expansion stroke included in one combustion cycle, the target value calculation unit 311 calculates the injection target values used to inject the fuel in the intake stroke, during the exhaust stroke and intake stroke (FIG. 12). The injector control unit 305 controls the injector 12 so that, when the target value calculation unit 311 has yet to complete the calculation of the injection target values during the intake stroke, the injector 12 injects the fuel in accordance with the injection target values calculated during the exhaust stroke and so that, when the target value calculation unit 311 completes the calculation of the injection target values during the intake stroke, the injector 12 injects the fuel in accordance with the injection target values calculated during the intake stroke (FIG. 12). Thus, even if the time point at which the calculation is completed during the intake stroke is delayed due to an increase in the processing load, or the like, the target amount of injection is calculated and the fuel in the target amount is injected from the injector 12.

In the above embodiment, if the target injection frequency included in the injection target values calculated by the target value calculation unit 311 is multiple times and if the injection possibility determination unit 313 determines that fuel injection according to the injection target values is impossible, the target value is modified by reducing the target injection frequency to once. However, the modified target injection frequency may be more than once. For example, if the target injection frequency is four times, the modified target injection frequency may be three times or twice. That is, the target value modification unit may be configured otherwise as long as it modifies the injection target value by reducing the target injection frequency. Accordingly, the injector control unit 305 serving as an injector control unit also may be configured otherwise.

While, in the above embodiment, the mode switching instruction unit 312 switches the injection mode between the F/C mode, in which fuel supply to the combustion chamber 105 is stopped, and the injection mode in which the fuel is injected into the combustion chamber 105 (adherence reduction mode M3 or homogeneity improvement mode M4), a first mode, in which the fuel is injected into the combustion chamber 105, and a second mode, in which fuel injection is stopped, may be injection modes other than those described above. In the above embodiment, fuel injection is started in the intake stroke as an injection start stroke, and the calculation of the injection target values used in the intake stroke is performed during the exhaust stroke preceding the intake stroke as a pre-injection stroke. However, the injection start stroke and pre-injection stroke may be strokes other than those described above. While, in the above embodiment, the injector 12 serving as a fuel injector is disposed obliquely downward with respect to the combustion chamber 105, the fuel injector may be configured otherwise as long as it injects the fuel into the combustion chamber facing the piston in the cylinder.

Figure 13:
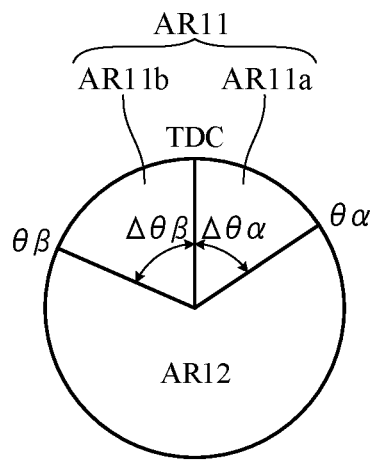
FIG. 13 is a diagram showing an example of an injection prohibited area and an injectable are.

In the above embodiment, the injection possibility determination unit 313 determines whether the fuel in the target amount can be injected in the injectable area. FIG. 13 is a diagram showing an example of the injection-prohibited area AR11 and injectable area AR12. As shown in FIG. 13, the prohibited area AR11 includes a first prohibited area AR11a obtained by increasing the crank angle θ from the intake top dead center (a first crank angle) TDC by a crank angle (a predetermined increase angle) Δθα and a second prohibited area AR11b obtained by decreasing the crank angle θ from the compression top dead center (a second crank angle) TDC by a second crank angle (a predetermined decrease angle) Δθβ. The first prohibited area AR11a is a range from the first crank angle TDC to a crank angle θα, and the second prohibited area AR11b is a range from a crank angle θβ to the second crank angle TDC. θβ corresponds to θb of FIG. 9. A range except for the first prohibited area AR11a and second prohibited area AR11b in a range from the first crank angle to the second crank angle is set as the injectable area AR12.

The invention can be also configured as a fuel injection control method for an internal combustion engine, the internal combustion engine including a piston reciprocating in a cylinder and a fuel injector arranged to inject a fuel into a combustion chamber facing the piston in the cylinder. Specially, the method includes: calculating injection target values including a target amount of injection, a target injection timing and a target injection frequency in an injectable crank angle area per a combustion cycle of the internal combustion engine, based on an operation state of the internal combustion engine; controlling the fuel injector so as to inject the fuel in accordance with the injection target values; instructing a switching from a first mode in which the fuel is injected into the combustion chamber to a second mode in which an injection of the fuel is stopped, and a switching from the second mode to the first mode; determining whether it is possible to inject the fuel in accordance with the injection target values when the switching from the second mode to the first mode is instructed; and modifying the injection target values by reducing the target injection frequency when it is determined that it is impossible to inject the fuel in accordance with the injection target values, under a state that the target injection frequency included in the injection target values is a plurality of times, and wherein the controlling includes controlling the fuel injector, when the injection target values are modified, so as to inject the fuel in accordance with modified injection target values.

The above embodiment can be combined as desired with one or more of the above modifications. The modifications can also be combined with one another.

According to the present invention, it is possible to earlier return from a fuel cut state when a fuel cut recovery condition is satisfied.

Above, while the present invention has been described with reference to the preferred embodiments thereof, it will be understood, by those skilled in the art, that various changes and modifications may be made thereto without departing from the scope of the appended claims.

What is claimed is:
1. A fuel injection control apparatus for an internal combustion engine, the internal combustion engine including a piston reciprocating in a cylinder, a fuel injector arranged to inject a fuel into a combustion chamber facing the piston in the cylinder, a crank angle sensor detecting a crank angle including a first crank angle at which an intake stroke is started and a second crank angle at which a compression stroke is ended, and an intake air amount sensor detecting an amount of intake air into the cylinder, the apparatus comprising an electronic control unit having a microprocessor and a memory, wherein the microprocessor is configured to perform:

determining an operation state of the internal combustion engine based on signals from the crank angle sensor and the intake air amount sensor;

calculating injection target values including a target amount of injection, a target injection timing and a target injection frequency in a combustion cycle of the internal combustion engine within an injectable crank area other than a first prohibited area in which the crank angle is increased from the first crank angle by a predetermined increase angle and a second prohibited area in which the crank angle is decreased from the second crank angle by a predetermined decrease angle among an area from the first crank angle to the second crank angle, based on the operation state of the internal combustion engine;

controlling the fuel injector so as to inject the fuel of the target amount of injection at the target injection timing in the injectable crank area;

instructing a switching from a multiple fuel injection mode in which the fuel is injected into the combustion chamber in the injectable crank area a plurality of times to a fuel cut mode in which an injection of the fuel is stopped, and a switching from the fuel cut mode to the multiple fuel injection mode;

determining whether it is possible to inject the fuel in accordance with the injection target values when the switching from the fuel cut mode to the multiple fuel injection mode is instructed, under a state that the target injection frequency included in the injection target values is the plurality of times; and modifying the injection target values by reducing the target injection frequency when it is determined that it is impossible to inject the fuel in accordance with the injection target values, and wherein the microprocessor is configured to perform the controlling including controlling the fuel injector, when the injection target values are modified, so as to inject the fuel in accordance with modified injection target values.

2. The apparatus according to claim 1, wherein the microprocessor is configured to perform the modifying including reducing the target injection frequency to once from the plurality of times.

3. The apparatus according to claim 1, wherein the microprocessor is configured to perform the calculating including calculating the injection target values when the fuel is injected in an injection start stroke, in each of the injection start stroke and a pre-injection stroke preceding the injection start stroke, the injection start stroke is one of an intake stroke, a compression stroke, an expansion stroke and an exhaust stroke included in the combustion cycle, and the pre-injection stroke is another one of the intake stroke, the compression stroke, the expansion stroke and the exhaust stroke, and the controlling including controlling the fuel injector so as to inject the fuel in accordance with the injection target values calculated in the pre-injection stroke before a calculation of the injection target values in the injection start stroke is complete, and to inject the fuel in accordance with the injection target values calculated in the injection start stroke after the calculation of the injection target values in the injection start stroke is complete.

4. The apparatus according to claim 3, wherein the pre-injection stroke is the exhaust stroke, and the injection start stroke is the intake stroke.

5. The apparatus according to claim 1, wherein the multiple fuel injection mode is a mode in which the fuel is injected in each of an intake stroke and a compression stroke of the internal combustion engine.

6. A fuel injection control method for an internal combustion engine, the internal combustion engine including a piston reciprocating in a cylinder, a fuel injector arranged to inject a fuel into a combustion chamber facing the piston in the cylinder, a crank angle sensor detecting a crank angle including a first crank angle at which an intake stroke is started and a second crank angle at which a compression stroke is ended, and an intake air amount sensor detecting an amount of an intake air into the cylinder, the method comprising determining an operation state of the internal combustion engine based on signals from the crank angle sensor and the intake air amount sensor;

calculating injection target values including a target amount of injection, a target injection timing, and a target injection frequency in a combustion cycle of the internal combustion engine within an injectable crank area other than a first prohibited area in which the crank angle is increased from the first crank angle by a predetermined increase angle and a second prohibited area in which the crank angle is decreased from the second crank angle by a predetermined decrease angle among an area from the first crank angle to the second crank angle, based on the operation state of the internal combustion engine;

controlling the fuel injector so as to inject the fuel of the target amount of injection at the target injection timing in the injectable crank area;

instructing a switching from a multiple fuel injection mode in which the fuel is injected into the combustion chamber in the injectable crank area a plurality of times to a fuel cut mode in which an injection of the fuel is stopped, and a switching from the fuel cut mode to the multiple fuel injection mode;

determining whether it is possible to inject the fuel in accordance with the injection target values when the switching from the fuel cut mode to the multiple fuel injection mode is instructed, under a state that the target injection frequency included in the injection target values is the plurality of times; and modifying the injection target values by reducing the target injection frequency when it is determined that it is impossible to inject the fuel in accordance with the injection target values, and wherein the controlling includes controlling the fuel injector, when the injection target values are modified, so as to inject the fuel in accordance with modified injection target values.

* * * * *